United States Patent [19]

LLoyd-Williams

[11] Patent Number: 4,696,681
[45] Date of Patent: Sep. 29, 1987

[54] PSA ASSEMBLY

[75] Inventor: Andrew LLoyd-Williams, High Bridge, N.J.

[73] Assignee: The BOC Group, Inc., Montvale, N.J.

[21] Appl. No.: 914,099

[22] Filed: Oct. 1, 1986

[51] Int. Cl.[4] .............................................. B01D 53/04
[52] U.S. Cl. ........................................ 55/28; 55/62; 55/68; 55/75
[58] Field of Search ................... 55/25, 26, 28, 31, 33, 55/35, 62, 74, 75, 179, 208, 267, 269, 387, 389, 68

[56] References Cited

U.S. PATENT DOCUMENTS

| | | | |
|---|---|---|---|
| 3,323,288 | 6/1967 | Cheung et al. | 55/62 X |
| 3,568,406 | 3/1971 | Dynes | 55/62 X |
| 3,734,293 | 5/1973 | Biskis | 55/208 X |
| 3,850,592 | 11/1974 | Huffman | 55/62 X |
| 4,030,896 | 6/1977 | Wimber et al. | 55/62 X |
| 4,256,469 | 3/1981 | Leitgeb | 55/62 X |
| 4,336,159 | 6/1982 | Winter | 55/62 X |
| 4,405,343 | 9/1983 | Othmer | 55/28 |
| 4,444,727 | 4/1984 | Yanagihara et al. | 55/208 X |
| 4,494,966 | 1/1985 | Umeki | 55/62 X |
| 4,511,375 | 4/1985 | BeVier | 55/208 X |

FOREIGN PATENT DOCUMENTS

| | | | |
|---|---|---|---|
| 109667 | 8/1979 | Japan | 55/179 |
| 114859 | 9/1979 | Japan | 55/208 |
| 121461 | 9/1979 | Japan | 55/208 |
| 128051 | 10/1979 | Japan | 55/208 |
| 92122 | 7/1980 | Japan | 55/208 |

Primary Examiner—Robert Spitzer
Attorney, Agent, or Firm—Larry R. Cassett; Chris P. Konkol; R. Hain Swope

[57] ABSTRACT

There is disclosed a process and apparatus for gas enrichment utilizing pressure swing adsorption techniques wherein the compressed gaseous mixture being processed is passed in indirect heat transfer relationship to a bed of adsorption material in an adsorption vessel undergoing regeneration wherein the heat of compression is employed to improve regeneration of the bed of adsorption material during the desorption step prior to passing the compressed gaseous mixture through a cooling system and thence through a bed of adsorption material for gas enrichment at a lower, more efficacious adsorption temperature.

13 Claims, 5 Drawing Figures

PSA ASSEMBLY

BACKGROUND OF THE INVENTION

(1) Field of the Invention

This invention relates to an improved process and apparatus for gas enrichment, and more particularly to an improved process and apparatus for gas enrichment using pressure swing adsorption techniques.

(2) Description of the Prior Art

The uses of adsorption techniques to separate a gaseous component from a gaseous stream initially were developed for the removal of carbon dioxide and water from air. The principles of gas adsorption were further refined to processes for enrichment of gases, such as hydrogen, helium, argon, carbon monoxide, carbon dioxide, nitrous oxide, oxygen and nitrogen. Still further refinements using at least two adsorption vessels in a cycling pressurized relationship resulted in an adsorption technique for gas enrichment, commonly referred to as pressure swing adsorption (PSA).

A typical PSA process and apparatus for producing a gas, such as nitrogen from air, employs two adsorption beds, each subjected to four distinct processing steps in each cycle. In a first step of the cycle, one adsorption bed is pressurized with concomitant nitrogen production while the other bed is regenerated, such as by venting, sometimes with a countercurrent flow of product-quality gas to enhance the regeneration (referred to as "purge"). In a second step, sometimes referred to as pressure equalization, the adsorption beds are brought to an equalized pressure by interconnection of the adsorption beds. In a third step of the cycle, the first adsorption bed is regenerated, while the second bed is pressurized with concomitant oxygen production. The last step of the cycle is pressure equalization between the beds.

During such pressure swings, pressure conditions in the adsorption beds vary between 15 psia and 120 psig in a process employing carbon molecular sieves for nitrogen production and somewhat lower pressure ranges in a process employing crystalline zeolites for producing oxygen. While such processes and apparatus have undergone significant refinements, significant energy losses are inherent in such gas enrichment processes as well as the fact that adsorption is itself an exothermic process whereas desorption is an endothermic process. Adsorption is therefore limited by the self-induced temperature rise which reduces adsorption capacity while desorption is slowed by the self-induced fall in temperature. Moreover, in large plants where radial heat transfer is limited, under certain conditions and with certain process parameters, it is possibel for thermal accumulations to produce permanent hot and cold zones which, if severe, can lead to process failure.

OBJECTS OF THE INVENTION

An object of the present invention is to provide an improved process and apparatus for effecting gas enrichment employing pressure swing adsorption techniques.

Another object of the present invention is to provide an improved process and apparatus for effecting gas enrichment employing pressure swing adsorption techniques with reduced energy requirements.

Yet another object of the present invention is to provide an improved process and apparatus for effecting gas enrichment employing pressure swing adsorption techniques resulting in increased produce per unit volume of adsorbent.

A further object of the present invention is to provide an improved process and apparatus for effecting gas enrichment employing pressure swing adsorption techniques of reduced plant capital costs.

SUMMARY OF THE INVENTION

These and other objects of the present invention are achieved in a process and apparatus for gas enrichment utilizing pressure swing adsorption techniques wherein the compressed gaseous mixture being processed is passed in indirect heat transfer relationship to a bed of adsorption material in an adsorption vessel undergoing regeneration wherein the heat of compression is employed to improve regeneration of the bed of adsorption material during the desorption step prior to passing the compressed gaseous mixture through a cooling system and thence through a bed of adsorption material for gas enrichment at a lower, more efficacious adsorption temperature.

BRIEF DESCRIPTION OF THE DRAWINGS

A better understanding of the present invention as well as other objects and advantages thereof will become apparent upon consideration of the detailed description thereof, especially when taken with the accompanying drawings, wherein.

DETAILED DESCRIPTION OF THE INVENTION

Figure 1:
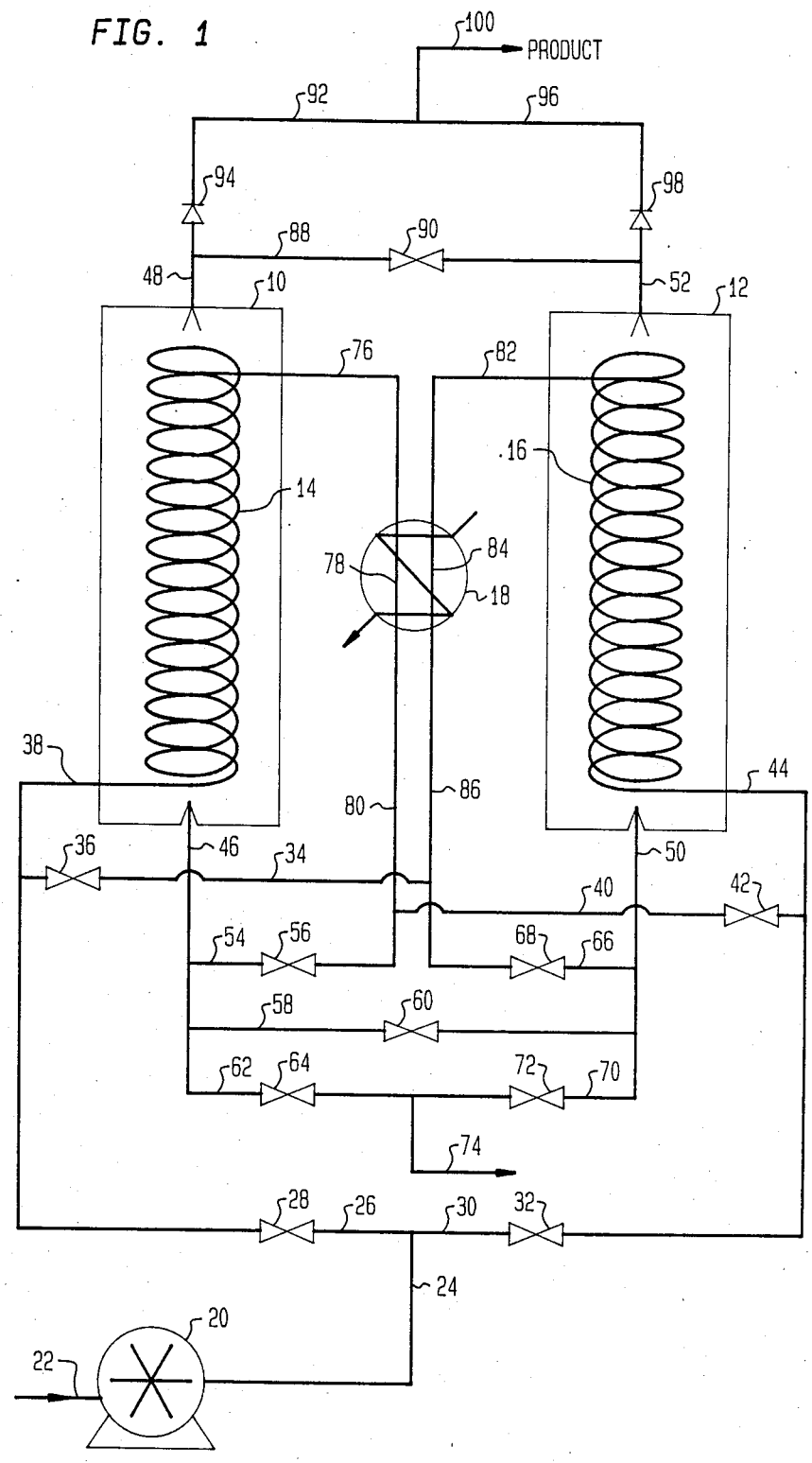
FIG. 1 is a schematic flow diagram including piping and valving of the process and apparatus of the present invention.

To facilitate an understanding of the present invention, certain valving and piping assemblies are not illustrated in the drawings; however, it will be understood that such additional valving, piping and instrumentation are provided consistent with accepted practices in the art. The present invention will be described in the context of nitrogen enrichment of air using an adsorbent bed of carbon molecular sieves, although it will be understood by one skilled in the art that the process and apparatus of the present invention is applicable to gas enrichment, per se, using pressure swing adsorption techniques.

Referring now to FIG. 1, there is illustrated a schematic flow diagram of the process and apparatus of the present invention including adsorption vessels 10 and 12, each having a heat transfer coil 14 and 16, respectively, disposed therein and each filled with a suitable adsorbent material. Intermediate the adsorption vessels 10 and 12 there is provided a cooling system 18 to provide certain process cooling requirements, as more fully hereinafter described. A compressor 20 is provided including an inlet conduit 22 on the suction side thereof and a discharge conduit 24.

The discharge conduit 24 is connected to a conduit 26 including a valve 28 and a conduit 30 including a valve 32. The conduit 26 is connected to a conduit 34 including a valve 36 and a conduit 38 in fluid flow communication with the heat transfer coil 14 disposed in adsorption vessel 10. The conduit 30 is connected to a conduit 40 including a valve 42 and a conduit 44 in fluid flow communication with the heat transfer coil 16 disposed in adsorption vessel 12.

The adsorption vessel 10 is provided with a lower conduit 46 and an upper conduit 48 whereas the adsorption vessel 12 is provided with a lower conduit 50 and an upper conduit 52. The lower conduit 46 of the adsorption vessel 10 is connected to conduit 54 under the control of valve 56, a conduit 58 under the control of valve 60, and a conduit 62 under the control of valve 64. The lower conduit 50 of the adsorption vessel 12 is connected to conduit 66 under the control of valve 68, the conduit 58 and a conduit 70 under the control of valve 72. Conduits 62 and 70 are connected by a conduit 74 to vent or the atmosphere.

The upper end of the heat transfer coil 14 disposed in the adsorption vessel 10 is connected by a conduit 76 to heat transfer coil 78 disposed in cooling system 18 with the heat transfer coil 78 being connected by conduit 80 with conduits 40 and 54 at the other end of the cooling system 18. The upper end of heat transfer coil 16 disposed in the adsorption vessel 12 is connected by a conduit 82 to a heat transfer coil 84 disposed in cooling system 18, with the heat transfer coil 84 being connected by conduit 86 with conduits 34 and 66 at the other end of the cooling system 18.

The upper conduit 48 of the adsorption vessel 10 is connected to a conduit 88 under the control of valve 90 and to a conduit 92 including a unidirectional flow valve 94. The upper conduit 52 of the adsorption vessel 12 is connected to the conduit 88 and to a conduit 96 including a unidirectional flow valve 98. Conduits 92 and 96 are connected to product conduit 100 in fluid flow communication to user equipment or storage (not shown). Automatic drains are provided at the lowest points in conduits 80/54 and 86/66 to remove condensate, thereby reducing the moisture level in the feed air and further enhancing the process.

Figure 2:
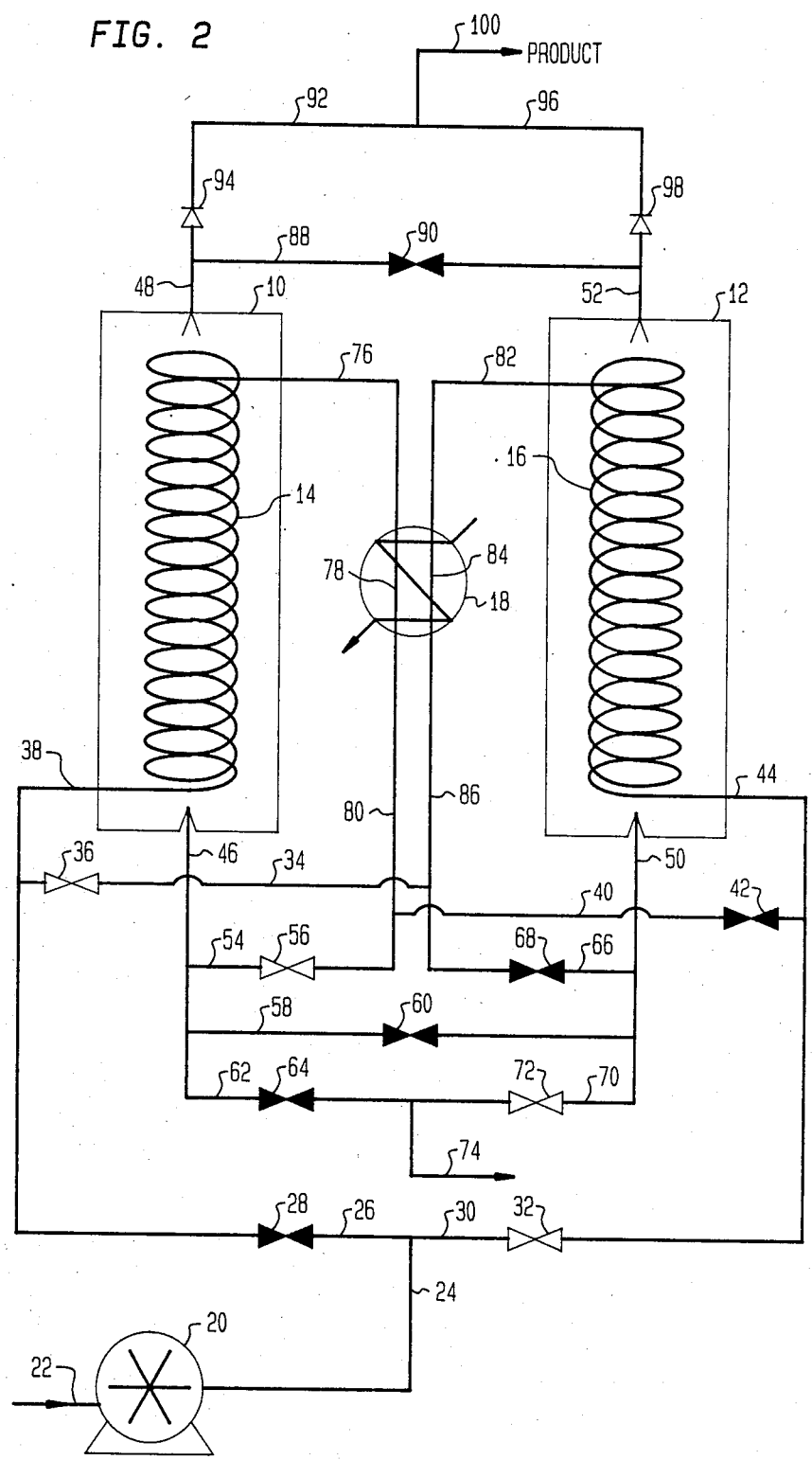
FIG. 2 is a schematic flow diagram of the process and apparatus of the present invention in a first stage of operation thereof.

In operation, let it be assumed that the apparatus is in operation and that adsorption vessel 10 has been desorbed whereas the adsorption vessel 12 requires regeneration, and that pressure equalization or balancing has been effected between the adsorption vessels. Referring now to FIG. 2, the valves are depicted either in white or black, illustrative of the same being in an opened or closed condition, respectively. Thus valves 32, 36, 56, and 72 are opened to permit fluid flow therethrough whereas valves 28, 42, 60, 64, 68 and 90 are closed.

Air at an ambient temperature in conduit 22 is compressed in compressor 20 to a pressure of from 30 to 150 psig and by compression is heated to a temperature of from 80° to 150° C. above the initial ambient temperature. Generally, the temperature of the air to be processed varies between about 0° to 38° C. thereby resulting in a temperature of the compressed air in conduit 24 of from 80° to 190° C. As hereinabove stated, the adsorption vessel 12 is undergoing regeneration. The compressed air in conduit 24 is passed through conduits 30 and 44 to the heat transfer coil 16 disposed in the adsorption vessel 12 wherein the compressed gas is passed in indirect heat transfer relationship to the bed of adsorbent material therein to facilitate desorption or regeneration of the bed of adsorbent material by permitting desorption of adsorbed gases at a higher temperature level. Introduction of the heated compressed gas into the inlet portion of adsorption vessel 12 provides a higher temperature level at the inlet portion of the bed of adsorbent material, where exists a higher concentration level of oxygen thereby to aid in the desorption process. Regeneration of the bed of adsorbent material in adsorption vessel 12 includes venting as well as subjecting same to atmospheric pressures or lower as known to one skilled in the art. During regeneration, a gaseous stream is withdrawn from adsorption vessel 12 by conduit 50 and passed through conduit 70 under the control of valve 72 to vent via conduit 74. During regeneration of the bed of adsorption material in the adsorption vessel, the temperature of the compressed gaseous stream in coil 16 is lowered to a temperature of from 65° to 75° C. with a concomitant elevation of a temperature differential of the adsorption material in the lower portion of from 2° to 10° C. to improve regeneration efficiency of the bed of adsorption material.

The compressed gas stream from the heat transfer coil 16 is passed through conduit 82 and thence through heat transfer coil 84 in cooling system 18 wherein the compressed air is cooled to a temperature level of from −10° to 10° C. The thus cooled compressed gas is then passed via conduits 86 and 34 and thence via conduit 38 through the heat transfer coil 14 disposed in the bed of adsorption material in adsorption vessel 10 reduces the temperature differential level of the bed of adsorption material therein to enhance oxygen adsorption, a temperature differential range of from 2° to 10° C. As hereinabove discussed, higher temperature levels of adsorption material enhance desorption while lower temperature levels enhance adsorption.

The compressed gas stream withdrawn in conduit 76 from the heat transfer coil 14 disposed in the adsorption vessel 10 is thereupon passed through heat transfer coil 78 disposed in the cooling system 18 to cool the compressed gas stream to a temperature of from −10° to 10° C. prior to introduction of the thus cooled compressed gas stream in conduit 80 into the adsorption vessel 10 via conduits 54 and 46.

Oxygen is adsorbed from the cooled compressed air stream in the adsorption vessel 10 at a lower temperature level to form a nitrogen enriched gaseous stream withdrawn from the adsorption vessel 10 through conduit 48 and passed by conduits 92 and 100 to product storage at a temperature of about 22° to 28° C. The flow of the thus cooled compressed air to adsorption vessel 10 in such manner is continued until a point is reached where the bed of the adsorption material in the adsorption vessel 10 is charged to a predetermined level, i.e. when the level of oxygen in the product gas reaches a predetermined threshold value. By such time, desorption of the bed of adsorption material in the adsorption vessel 12 is completed whereupon valves 32, 36, 56 and 72 are closed and valves 28, 42, 60, 68 and 90 are opened to initiate and permit the step of pressure equalization, referring now to FIG. 3.

Figure 4:
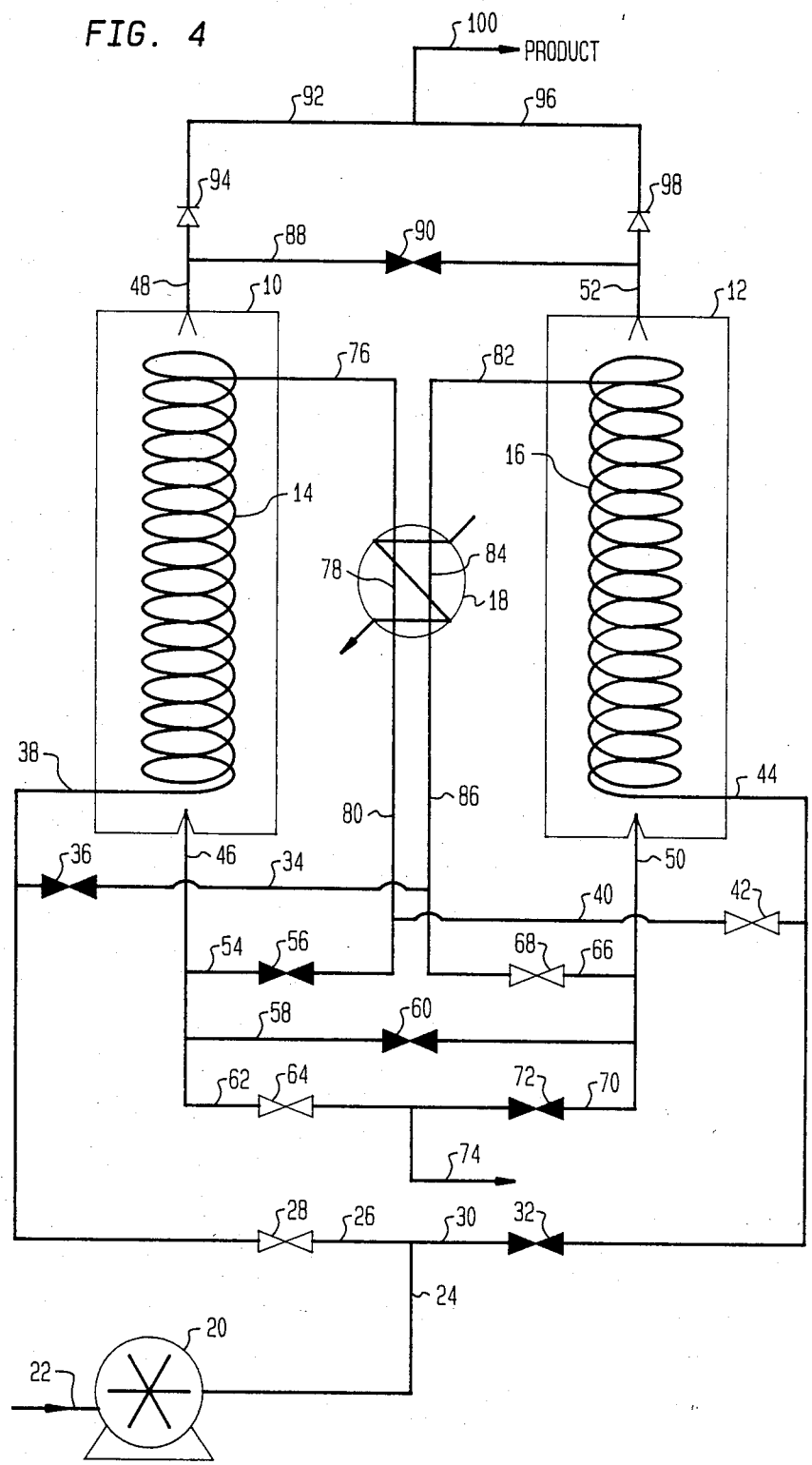
FIG. 4 is a schematic flow diagram of the process and apparatus of the present invention in a third stage of operation thereof.

The step of pressure equalization is effected for a time sufficient for such purpose, generally of from 2 to 10 seconds depending on the volume and type of the bed of adsorption material in the adsorption vessels 10 and 12. At a preselect time in the operational cycle, valves 60 and 90 are closed, and valve 64 is opened, referring now to FIG. 4, thereby placing adsorption vessel 12 in a nitrogen production mode and adsorption vessel 10 into a regeneration mode.

Accordingly, compressed air in conduit 24 is now passed through conduits 26 and 38 to the heat transfer coil 14 disposed in the adsorption vessel 10 wherein the compressed gas is passed in indirect heat transfer with the adsorbent material therein to facilitate desorption or regeneration of the bed of adsorbent material therein. Regeneration of the bed of adsorbent material in adsorption vessel 10 is effected in like manner to that of the bed of adsorption material in adsorption vessel 12 as known to one skilled in the art. During regeneration, a gaseous stream is withdrawn from adsorption vessel 10 by conduit 46 and is passed through conduit 62 under the control of valve 64 to vent via conduit 74. During regeneration of the bed of adsorption material in the adsorption vessel, the temperature of the compressed gaseous stream is lowered with a concomitant elevation of the temperature of the adsorption material as hereinabove discussed with reference to FIG. 1.

The compressed gas stream from heat transfer coil 14 is passed through conduit 76 and thence through heat transfer coil 78 in cooling system 18 wherein the compressed air stream is cooled for subsequent passage of such thus cooled compressed gas via conduits 80 and 40 and thence via conduit 44 through the heat transfer coil 16 disposed in the bed of adsorption material in adsorption vessel 12 reduces the temperature level of the bed of adsorption material therein. The compressed gaseous stream withdrawn in conduit 82 from the heat transfer coil 16 disposed in the adsorption vessel 12 is passed through heat transfer coil 84 disposed in the cooling system 18 to cool the compressed gas stream prior to introduction of the thus cooled compressed gas stream in conduit 80 into the adsorption vessel 10 via conduits 54 and 46.

Figure 5:
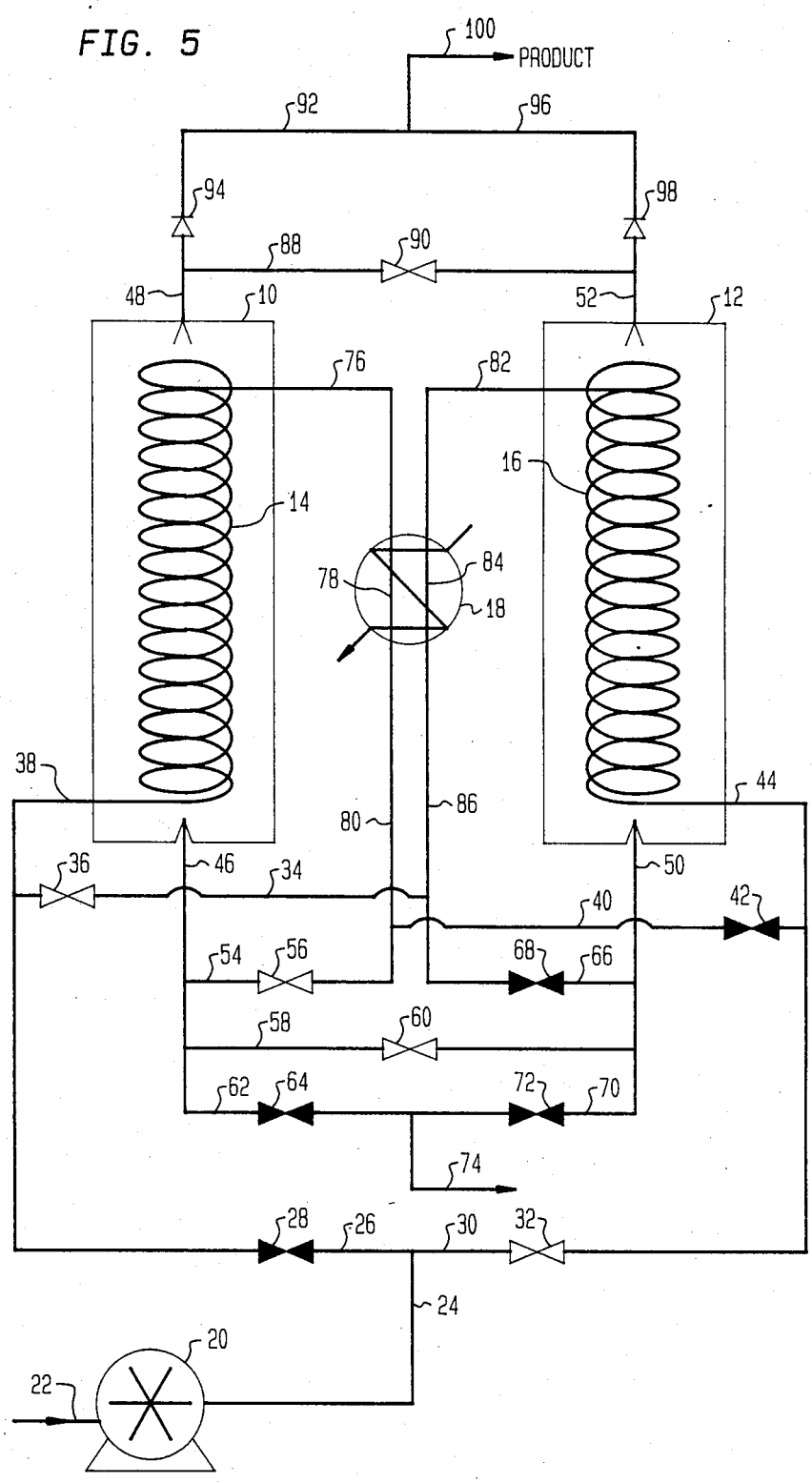
FIG. 5 is a schematic flow diagram of the process and apparatus of the present invention in a fourth stage of operation.

A nitrogen-enriched product gaseous stream is withdrawn from the adsorption vessel 12 through conduit 52 and passed by conduits 96 and 100 to product storage. The flow of cooled compressed air to adsorption vessel 12 in such manner is continued to the point where the bed of the adsorption material in the adsorption vessel 12 is charged to a predetermined level, i.e when the level of oxygen in the product gas reaches a threshold value. By such time, desorption of the bed of adsorption material in the adsorption vessel 10 is completed whereupon valves 28, 42, 64 and 68 are closed and valves 32, 36, 56, 60 and 90 are opened to initiate and permit the step of pressure equalization, referring now to FIG. 5, as discussed with reference to FIG. 3.

The following example is illustrative of the process of the present invention, and it is to be understood that the scope of the invention is not to be limited thereby:

EXAMPLE

A two-bed unit having adsorption beds (1'×6') having about 50' of 1" copper heat transfer tubing disposed therein is filled with 4" layer of activated alumina overlayed with carbon molecular sieve and including the piping and valving assembly as illustrated in FIG. 1. The heat exchanger 18 is provided with a cascade water cooling and freon refrigerant system. The compressor 20 is rated at maximum flow of 40 scfm and the various conduits are provided with suitable insulation.

Air compressed to 100 psig at a temperature of 94° C. is passed to the heat transfer coil 16 in the adsorption vessel 12 for a period of 5 minutes wherein the inlet portion of the adsorption bed is raised to a temperature of about 26.6° C. The compressed gas lowered to a temperature of about 23.8° C. is withdrawn from the adsorption vessel 12 and passed to the heat exchanger 18 and cooled to a temperature of about 1° C. The thus cooled gas is then passed through the heat transfer coil 14 of the adsorption vessel 10 and lowers the temperature of the inlet portion of the bed to about 21.4° C. and exits the heat transfer coil 14 of the adsorption vessel 10 at about 23.8° C. for cooling to 1° C. in the heat exchanger 18 before introduction into the adsorption bed of the adsorption vessel 10. Nitrogen containing 0.5% oxygen is withdrawn for a period of 5 minutes from the adsorption vessel 10 and passed to user equipment or storage.

During this same 5 minute period, a small flow of nitrogen is withdrawn from the user storage and is introduced to the outlet end of adsorption vessel 12 via conduit 52, bypassing flow valve 98 (additional lines not shown in figures). This small flow of nitrogen provides a purge stream to assist desorption of oxygen from adsorption vessel 12. Meanwhile, oxygen-rich gas is withdrawn from vessel 12 and is vented to atmosphere via valve 72.

Figure 3:
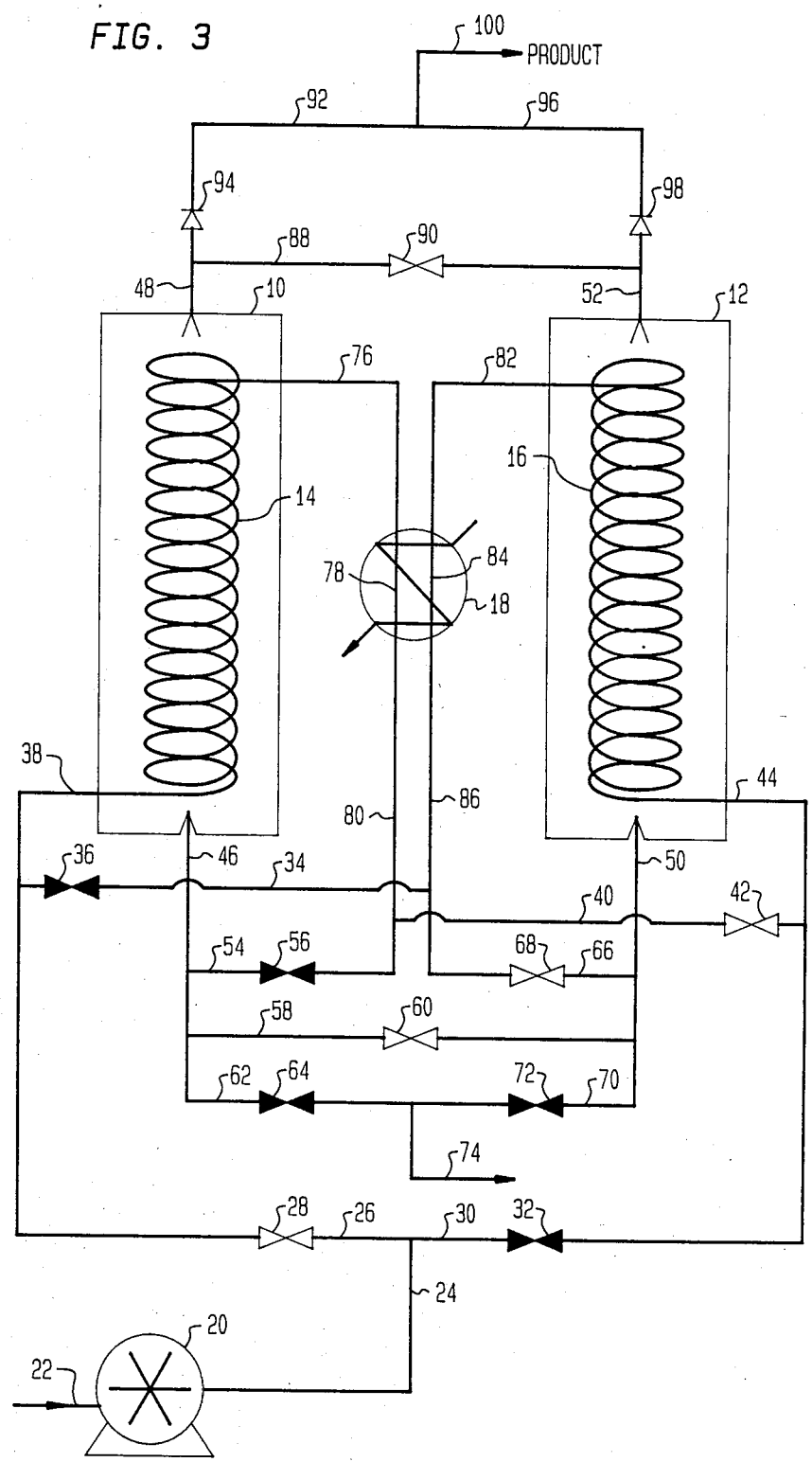
FIG. 3 is a schematic flow diagram of the process and apparatus of the present invention in a second stage of operation thereof.

There follows a period of 5 seconds of pressure equalization, during which the two adsorption vessels are interconnected as shown in FIG. 3. Colder gas in vessel 10 flows into vessel 12 via conduits 88 and 58 until pressures in the two vessels are almost equal.

For the following 5 minutes the process is reversed, and hot air is passed to the heat transfer coil 14 in adsorption vessel 10, in a process of fluid flow as hereinabove generally described with reference to the fluid flow through the heat transfer coil 16 in adsorption vessel 12.

The benefits of this system are that adsorption capacity of the adsorbing vessel is increased by reducing the temperature, more so at the inlet end where the greater oxygen concentration occurs. Further, by raising the temperature during desorption, more so at the inlet end when the greater amount of oxygen is adsorbed, the rate and extent of desorption are enhanced, providing yet more capacity for adsorption during the following step.

As a result, production capacity is increased by approximately 4% per 1° C. differential between adsorption and desorption temperatures. In this example, the production increase is approximately 20% over the same unit operated in accordance with standard PSA techniques.

In accordance with the instant invention, the heat of compression of the gaseous stream to be procesed is used in the regeneration of the bed adsorption material by enhancing desorption, i.e. effecting desorption at a high temperature level, whereas available cooling water is used to enhance adsorption of preselect components of the gaseous stream, i.e. effecting adsorption at lower temperature levels. Accordingly, higher production rates, i.e. from 500 scfh $N_2$ to 600 scfh $N_2$ are achieved, i.e. increased production levels per unit volume of adsorbent as compared to PSA process and apparatus of the prior art.

While the present invention has been described in connection with an exemplary embodiment thereof, it will be understood that many modifications will be apparent to those of ordinary skill in the art, and that this application is intended to cover any adaptations or variations thereof. Therefore, it is manifestly intended that this invention be only limited by the claims and the equivalents thereof.

What is claimed is:

1. In a process for selective enrichment of a component of a compressed gaseous mixture wherein at least two beds of adsorption material are cycled through an adsorption step and a desorption step, the improvement comprising passing said compressed gaseous mixture in indirect heat transfer relationship to a bed of said adsorption material during desorption of said bed of said adsorption material and passing said gaseous mixture in indirect heat transfer relationship through a bed of adsorption material during selective enrichment of said component prior to the introduction of said gaseous mixture into said bed of adsorption material for selective enrichment.

2. The process as defined in claim 1, wherein said compressed gaseous mixture withdrawn from said bed of adsorption material during desorption thereof is cooled prior to passage in indirect heat transfer relationship to said bed of adsorption material during selective enrichment by adsorption of said component.

3. The process as defined in claim 2 wherein said compressed gaseous mixture withdrawn from passage in indirect heat transfer relationship to said bed of said adsorption material is cooled prior to introduction into said bed of adsorption material for selective enrichment.

4. The process as defined in claim 3 wherein said compressed gaseous mixture is cooled to a temperature of from $-10°$ to $10°$ C.

5. The process as defined in claim 2 wherein said compressed gaseous mixture is cooled to a temperature of from $-10°$ to $10°$ C.

6. The process as defined in claim 1 wherein said bed of adsorption material is formed of molecular carbon sieves to produce a nitrogen-enriched product stream.

7. A process for selective enrichment of a component of a gaseous mixture, which comprises the steps of:
   (a) compressing said gaseous mixture;
   (b) passing said gaseous mixture in indirect heat transfer relationship to a first bed of adsorption material to enhance desorption of an adsorbed component of said gaseous mixture;
   (c) cooling said gaseous mixture of step (b);
   (d) passing said gaseous mixture of step (c) in indirect heat transfer relationship through a second bed of adsorption material;
   (e) cooling said gaseous mixture of step (d);
   (f) passing said gaseous mixture of step (e) through said second bed of adsorption material to adsorb a component of said gaseous mixture; and
   (g) recovering a gaseous product from step (f) enriched in said component.

8. The process as defined in claim 7 wherein said gaseous mixture of step (c) is cooled to a temperature of from $-10°$ to $10°$ C.

9. The process as defined in claim 7 wherein said gaseous mixture of step (e) is cooled to a temperature of from $-10°$ to $10°$ C.

10. The process as defined in claim 7 wherein said first bed of adsorption material is raised a temperature differential of about $2°$ to $10°$ C. during step (b).

11. The process as defined in claim 7 wherein said second bed of adsorption material is lowered a temperature differential of about $2°$ to $10°$ C. during step (d).

12. The process as defined in claim 7 wherein said compressed gaseous mixture is air compressed to a pressure of from 30 to 150 psig at a temperature of from $80°$ to $190°$ C.

13. The process as defined in claim 12 wherein said adsorption materials are carbon molecular sieves and said gaseous product is enriched nitrogen.

* * * * *